US006938575B1

(12) United States Patent
Ohta et al.

(10) Patent No.: US 6,938,575 B1
(45) Date of Patent: Sep. 6, 2005

(54) METHOD FOR TREATING HATCHING EGGS AND METHOD FOR HATCHING EGGS

(75) Inventors: Yoshiyuki Ohta, Tokyo (JP); Hiroyuki Sato, Kanagawa (JP)

(73) Assignee: Ajinomoto Co., Inc., Tokyo (JP)

( * ) Notice: Subject to any disclaimer, the term of this patent is extended or adjusted under 35 U.S.C. 154(b) by 276 days.

(21) Appl. No.: 10/030,142

(22) PCT Filed: Jul. 28, 2000

(86) PCT No.: PCT/JP00/05114

§ 371 (c)(1),
(2), (4) Date: Jan. 28, 2002

(87) PCT Pub. No.: WO01/08475

PCT Pub. Date: Feb. 8, 2001

(30) Foreign Application Priority Data

Jul. 29, 1999  (JP) .......................... 11/214496

(51) Int. Cl.⁷ ............................................. A01K 43/00
(52) U.S. Cl. ...................................................... 119/6.8
(58) Field of Search .................. 119/6.8, 174; 424/400, 424/85.2; 426/2

(56) References Cited

U.S. PATENT DOCUMENTS

| | | | | |
|---|---|---|---|---|
| 4,458,630 A | * | 7/1984 | Sharma et al. ............... | 119/6.8 |
| 4,604,968 A | * | 8/1986 | Christensen ................. | 119/6.8 |
| 4,973,595 A | * | 11/1990 | Robel .......................... | 514/345 |
| 5,028,421 A | * | 7/1991 | Fredericksen et al. ..... | 424/85.2 |
| 5,106,617 A | * | 4/1992 | Federicksen et al. ...... | 424/85.2 |
| 5,158,038 A | * | 10/1992 | Sheeks et al. ............... | 119/6.8 |
| 5,206,015 A | * | 4/1993 | Cox et al. ................... | 424/93.3 |
| 5,431,933 A | * | 7/1995 | Binder et al. ................ | 426/60 |
| 6,032,612 A | * | 3/2000 | Williams ..................... | 119/6.8 |
| 6,329,001 B1 | * | 12/2001 | Ivey et al. .................... | 426/2 |
| 6,395,961 B1 | * | 5/2002 | Petitte et al. ................. | 800/21 |
| 6,410,222 B1 | * | 6/2002 | Yokogawa et al. ......... | 424/204.1 |
| 6,592,878 B2 | * | 7/2003 | Uni et al. .................... | 424/400 |
| 2002/0035965 A1 | * | 3/2002 | Uni et al. .................... | 119/6.8 |

OTHER PUBLICATIONS

W. K. Al–Murrani, Effect of Injecting Amino Acids into the Egg on Embryonic and Subsequent Growth in the Domestic Fowl, (1982), British Poultry Science, vol. 23, pp. 171–174.*

S. Katsumata et al, *Bulletin of the College of Agriculture and Veterinary Medicine, Nihon University*, vol. 34, pp. 223–231 (1977) (English translation).

Y. Ohta et al. Poultry Science, vol. 78(11), pp. 1493–1498 1999.

Seiichi Katsumata et al. Technical Research Report, Nihon Daigaku Noujuui Gakubu, vol. 34, pp. 223–231 1997.

E.J. Robel et al. British Poultry Science, vol. 32, pges 509–513.

E.J. Robel et al. Poultry Science, vol. 72, pp. 546–553 1993.

* cited by examiner

*Primary Examiner*—Yvonne R. Abbott
(74) *Attorney, Agent, or Firm*—Oblon, Spivak, McClelland, Maier & Neustadt, P.C.

(57) ABSTRACT

A method for treating a fertilized egg of a bird, a method for increasing the body weight of a chick at hatch, and a method for increasing the hatchability of a fertilized egg of a bird, comprising injecting, into the fertilized egg after start of incubation, a solution containing amino acids which determine the nutritive value of proteins in the fertilized egg; a method for hatching a fertilized egg of a bird, comprising hatching the fertilized egg after start of incubation treated according to the treatment method; a fertilized egg of a bird after start of incubation, the egg being treated according to the treatment method; and a bird hatched from the fertilized egg.

23 Claims, No Drawings

METHOD FOR TREATING HATCHING EGGS AND METHOD FOR HATCHING EGGS

TECHNICAL FIELD

The present invention relates to an improvement of a method for producing chicks by artificial hatch of fertilized eggs of birds. More particularly, the present invention relates to a method for enhancing the productivity of chicks by carrying out a treatment for supplying nutrition by injecting a mixed solution of amino acids into fertilized eggs.

BACKGROUND OF THE INVENTION

In the factories of producing chicks including broilers, efforts for improvement have been made for enhancing the productivity of hatched chicks until they grow to a stage suitable for eating. For example, in chickens, it is tried to accelerate the growth by adding various nutrition-supplements such as vitamins to feeds.

Moreover, since the size of chicks hatched from fertilized eggs and the growth rate after hatch are generally proportional to the size and protein amount of fertilized eggs, much efforts for improving nutrition of parent chickens have been made for the purpose of producing fertilized eggs having a large size and containing a large amount of proteins. However, an egg-production ratio is generally low in the parent chickens laying fertilized eggs having a large size and containing a large amount of proteins. Therefore, the feeding cost for the parent chickens cannot be disregarded, which is required for securing regularly a large number of such fertilized eggs having a large size and containing a large amount of proteins.

DISCLOSURE OF THE INVENTION

An object of the present invention is to provide a method capable of supplying regularly a large number of chicks at a low cost, the chicks having body weight at hatch heavier than that usually expectable from the size of fertilized eggs and being capable of shortening the term necessary for reaching a stage suitable for eating after hatch. More specifically, an object of the present invention is to provide a method for treating fertilized eggs for obtaining fertilized eggs capable of supplying chicks which have heavy body weight at hatch and are capable of shortening the term necessary for reaching a stage suitable for eating after hatch.

In order to achieve the above and other objects, the present invention basically relates to injection of amino acids into fertilized eggs of birds, the amino acids being substances determining the nutritive value of the proteins in the fertilized eggs, and the present invention includes the following each invention.

(1) A method for treating a fertilized egg of a bird, comprising injecting, into the fertilized egg after start of incubation, a solution containing amino acids which determine the nutritive value of proteins in the fertilized egg.
(2) The method according to (1), wherein the fertilized egg is a chicken egg on days 13 to 19 of the incubation.
(3) The method according to (1), wherein the fertilized egg is a chicken egg on days 13 to 14 of the incubation.
(4) The method according to any one of (1) to (3), k wherein the solution containing amino acids is a mixed solution of amino acids having a composition which is almost the same as the amino acid composition in the fertilized egg before the start of incubation.
(5) The method according to any one of (1) to (4), wherein the solution containing amino acids contains an antioxidant, a nutritional supplement other than said amino acids, and/or a vaccine.
(6) A method for hatching a fertilized egg of a bird, comprising hatching the fertilized egg after start of incubation treated according to the method of any one of (1) to (5).
(7) A method for increasing the body weight of a chick at hatch, comprising injecting, into a fertilized egg after start of incubation, a solution containing amino acids which determine the nutritive value of proteins in the fertilized egg.
(8) The method according to (7), wherein the fertilized egg is a chicken egg on days 13 to 19 of the incubation.
(9) The method according to (7), wherein the fertilized egg is a chicken egg on days 13 to 14 of the incubation.
(10) The method according to any one of (7) to (9), wherein the solution containing amino acids is a mixed solution of amino acids having a composition which is almost the same as the amino acid composition in the fertilized egg before the start of incubation.
(11) The method according to any one of (7) to (10), wherein the solution containing amino acids contains an antioxidant, a nutritional supplement other than said amino acids, and/or a vaccine.
(12) A method for increasing the hatchability of a fertilized egg of a bird, comprising injecting, into the fertilized egg after start of incubation, a solution containing amino acids which determine the nutritive value of proteins in the fertilized egg.
(13) The method according to (12), wherein the fertilized egg is a chicken egg on days 13 to 19 of the incubation.
(14) The method according to (12), wherein the fertilized egg is a chicken egg on days 13 to 14 of the incubation.
(15) The method according to any one of (12) to (14), wherein the solution containing amino acids is a mixed solution of amino acids having a composition which is almost the same as the amino acid composition in the fertilized eggs before the start of incubation.
(16) The method according to any one of (12) to (15), wherein the solution containing amino acids contains an antioxidant, a nutritional supplement other than said amino acids, and/or a vaccine.
(17) A fertilized egg of a bird after start of incubation, said egg being treated according to the method of any one of (1) to (5).
(18) A bird hatched from a fertilized egg after start of incubation, said egg being treated in accordance with the method according to any one of (1) to (5).

BEST MODE FOR CARRYING OUT THE INVENTION

The fertilized eggs to be treated by the method of the present invention are not particularly limited, so long as the eggs are eggs of birds capable of subjecting to artificial hatch. The injection of nutrient into fertilized eggs by the above treatment of injecting amino acids improves not only the growth of embryos in the fertilized eggs after the start of incubation but also the growth of chicks hatched from the treated fertilized eggs. Therefore, the treating method of the present invention is particularly suitable for the treatment of fertilized eggs of chickens including broilers.

The composition of the solution containing amino acids for use in the method of the present invention is not particularly limited as far as the solution contains amino acids determining the proteins in fertilized eggs. Preferred is a mixed solution of amino acids having a composition which is almost the same as the amino acid composition in the fertilized eggs before the start of acids for use in the method of the present invention is abbreviated as an "amino acid solution".

Examples of a suitable amino acid solution include an amino acid solution having a composition shown in Table 1.

In the amino acid composition in Table 1, it is possible to use phenylalanine instead of tyrosine. Moreover, any mixed solution of amino acids having the composition ratio of amino acids shown in Table 1 can be employed even when the concentration is different.

TABLE 1

(Composition of Amino Acids)

| Amino acid | (g/l) |
|---|---|
| Asparagine | 10.6 ± 1 |
| Threonine | 5.0 ± 1 |
| Serine | 7.7 ± 1 |
| Glutamine | 14.0 ± 1 |
| Glycine | 3.5 ± 1 |
| Alanine | 6.0 ± 1 |
| Valine | 6.7 ± 1 |
| Cystine | 2.2 ± 1 |
| Methionine | 3.8 ± 1 |
| Isoleucine | 5.4 ± 1 |
| Leucine | 9.1 ± 1 |
| Tyrosine | 1.7 ± 1 |
| Phenylalanine | 5.6 ± 1 |
| Lysine | 7.6 ± 1 |
| Histidine | 2.7 ± 1 |
| Arginine | 6.5 ± 1 |
| Proline | 3.9 ± 1 |
| Tryptophan | 1.9 ± 1 |

In the present invention, the amino acids are injected as a solution in a liquid, and the liquid to be used is not particularly limited unless it adversely affects the incubation. Examples include distilled water and physiological saline.

The concentration of the amino acid solution for use in the method of the present invention and the amount of amino acids to be injected are not particularly limited, so long as necessary amounts of amino acids can be administered into fertilized eggs. The amino acid solution can be used in a concentration range of usually 30 to 220 g/l, preferably 30 to 180 g/l, and more preferably 50 to 160 g/l.

Moreover, the amount of the amino acid solution to be injected into fertilized eggs is an amount capable of administering a necessary amount of aimed amino acids into the fertilized eggs, and the amount to be injected generally ranges from 0.2 to 1.0 ml/fertilized egg.

Furthermore, the amino acid solution may contain an antioxidant, a nutritional supplement such as a vitamin, and other additives and carriers which do not affect adversely on the hatch of fertilized eggs and the growth of birds.

The treatment of injecting the amino acid solution into fertilized eggs by the method of the present invention is subjected to the fertilized eggs after the start of incubation. The part of injecting the amino acid solution into the fertilized eggs after the start of incubation is the parts of egg yolk and albumen, and/or inner tissues of fertilized eggs, excluding an air cell and an embryo in the fertilized eggs. At the part of the air cell, the amino acid solution is blocked by chorioallantois and thus no nutrition-supplying effect on the embryo is realized, while there is a possibility that the embryo is destroyed by entering the needle for injection to cause no occurrence of hatch in injection into the embryo part. Therefore, it is preferable to avoid the injection into these parts.

The timing for injection is preferably the time when the embryo rapidly grow in the fertilized eggs.

In chicken eggs, for example, with the growth of the embryo in a fertilized egg, the egg yolk in saccus vitellinus gradually decreases until about days 7 of the incubation, but rapid decrease of the egg yolk is observed on day 7 to about day 14, and then after day 14, the decrease of the yolk becomes again gradual. From these facts, as the timing for nutrition enhancement of incubating eggs by injecting amino acids, the injection is effective on days 7 to 14 of the incubation. Particularly, the injection of amino acids is carried out on days 10 to 14, more preferably on days 13 to 14, and particular preferably on day 14 of the incubation. After day 14, the effect of injection is not so remarkable as compared with the injection until day 14, but the effects of improving hatchability of fertilized eggs and body weight at the hatch by the injection of the amino acid solution can be expected until day 19 depending on the kind of fertilized eggs.

Moreover, especially on days 10 to 14 of the incubation, the embryo is resistant to the amino acid solution even when the amino acid solution comes into contact with the growing embryo and the embryo is less damaged owing to low possibility of the contact with the needle, so that the part to be injected is not particularly limited. Accordingly, the injection is preferably carried out during this term also from the viewpoint of the easiness of injection operation. When amino acids are injected on days 7 to 9 of the incubation, the injection into the egg yolk part is preferable.

In fertilized chicken eggs, the parts of the egg yolk and albumen in the fertilized eggs have regions capable of easily inserting a needle for injection into the parts until about day 14 after the start of incubation and the embryo itself is resistant so as not to be damaged easily by the needle for injection, so that the injection of the amino acid solution is preferably carried out on day 14. As above, the injection of the amino acid solution at the time when the embryo is resistant to the damage by the needle for injection, the growth of the embryo is rapid and nutrition consumption is fast provides an important technical significance that the treatment of injecting amino acids can be realized by means of an automatic apparatus which injects the amino acid solution into a large number of fertilized eggs at once with a large number of needles for injection arranged in a line. However, so long as a careful injection of amino acids is carried out so as not to damage the tissues in the fertilized eggs, the effects of the amino acid injection can be fully expected even after day 14. In addition, the amino acid solution can be injected together with a vaccine such as the vaccine for Marek's disease.

The treatment of injecting amino acids according to the present invention can increase the body weight of chicks, for example, at hatch by 1 to 2% as the ratio of body weight at hatch/egg weight. Moreover, the hatchability can be increased, for example, by 5 to 30%.

EXAMPLES

The present invention is more specifically explained with reference to Examples, but the present invention is not limited to these Examples.

Example 1

Fertilized eggs of a broiler (Chunky) were sterilized with 70% alcohol and the eggs were divided into 6 groups, each group being composed of 10 eggs, based on the measurement of egg weight so that each group had the same average egg weight±standard deviation (51.2±0.2 g), followed by incubation at a temperature of 37.8° C. and a relative humidity of 60%. The eggs under incubation were checked every one week to remove undeveloped eggs. On day 14 of the incubation, one group was left untreated as a control group, and a hole was made at the eggshell on the air cell of each egg of remaining five groups, followed by injection of 0.5 ml of a solution (hereinafter, referred to as "amino acid solution") of an amino acid mixture dissolved in sterile distilled water into the egg yolk, the mixture being used in an amount so as to become a concentration of 0, 53, 106, 159, or 212 mg/ml. Thereafter, the hole was closed with paraffin and the incubation was continued. The injection treatment was carried out aseptically in a clean bench.

The amino acid solution used for the injection had a composition similar to the composition shown in Table 1, with the exception that sparingly soluble tyrosine was replaced by phenylalanine.

With regard to the fertilized eggs, the hatching time and the body weight at hatch were measured every one hour from day 19 of the incubation, the starting day of the incubation being zero day.

A 1 ml disposable syringe (manufactured by Terumo Corporation) was used as the syringe for injecting the amino acid solution into the fertilized eggs and 27G×¾" (manufactured by Terumo Corporation) was used as the needle for injection.

With regard to the hatchability, a significant difference was determined by a $\chi$-square test based on the results obtained. With regard to other indexes, analysis of variance was carried out and difference between average values was tested by LSD method. The statistical risk was set to 5%.

The results are shown in Table 2.

TABLE 2

| Treated group | Egg weight (g) | Hatch-ability (%) | Body weight at hatch (g) | Body weight at hatch/egg weight (%) |
|---|---|---|---|---|
| Control Group | 51.0 ± 2.9[1] | 70.0[1] | 36.9 ± 3.2[1] | 73.0 ± 2.6[1] |
| Amino acid-injected Groups (mg/ml) | | | | |
| 53.0 | 51.1 ± 2.0 | 90.0 | 36.5 ± 4.5 | 71.8 ± 7.6 |
| 106.0 | 51.5 ± 2.2 | 90.0 | 38.6 ± 1.9 | 75.0 ± 1.3 |
| 159.0 | 51.4 ± 2.4 | 80.0 | 38.0 ± 2.5 | 73.5 ± 2.1 |

[1]Each value is an average value ± standard deviation of 10 fertilized eggs.

Table 2 shows that the hatchability of the fertilized eggs of control group is 70.0%, but the hatchability of the fertilized eggs to which the amino acid solution having a concentration of 53.0 mg/ml to 159.0 mg/ml was injected is from 80 to 90%. This result apparently indicates that the method of the present invention contributes the enhancement of hatchability of fertilized eggs.

Moreover, with regard to the body weight at hatch, the body weight at hatch/egg weight of the fertilized eggs of the control group is 73.0±2.6%, while the ratio of the fertilized eggs to which the amino acid solution having a concentration of 53.0 mg/ml to 159.0 mg/ml was injected is the same as or higher than the value. In particular, the group injected with an amino acid solution having a concentration of 106.0 mg/ml shows a value of 75.0±1.3%, which clearly indicates that the injection of the amino acid solution is a method capable of obtaining chicks having heavier body weight at hatch than those of non-treated fertilized eggs.

Example 2

Fertilized eggs of a broiler (Chunky) were sterilized with 70% alcohol and the eggs were divided into 6 groups, each group being composed of 10 eggs, based on the measurement of egg weight so that each group has the same average egg weight standard deviation (51.2±0.2 g), followed by incubation at a temperature of 37.8° C. and a relative humidity of 60%. The eggs under incubation were checked every one week to remove undeveloped eggs. Day 14 of the incubation, one group was left untreated as a control group, and a hole was made at the eggshell on the air cell of each egg of remaining five groups, followed by injection of an amino acid solution having a concentration of 106 mg/ml in an amount of five different levels, i.e., 0, 0.25, 0.5, 0.75, and 1 ml into the egg yolk. Thereafter, the hole was closed with paraffin and the incubation was continued. The injection treatment was carried out aseptically in a clean bench.

The amino acid solution used for the injection had a composition similar to the composition used in above Example 1, and the syringes and needles for injecting the amino acid solution into the fertilized eggs were also the same as those used in Example 1.

With regard to the fertilized eggs, the hatching time and the body weight at the hatch were measured every one hour from day 19 of the incubation, the starting day of the incubation being zero day.

With regard to the hatchability, a significant difference was determined by a $\chi$-square test based on the results obtained. With regard to other indexes, analysis of variance was performed and difference between average values was tested by LSD method. The statistical risk was set to 5%.

The results are shown in Table 3.

TABLE 3

| Injected amino acid amount (ml) | Egg weight (g) | Hatch-ability (%) | Body weight at hatch (g) | Body weight at hatch/egg weight (%) |
|---|---|---|---|---|
| 0 (Control) | 58.3 ± 2.6[1] | 75.0[1] | 42.6 ± 2.6[b1] | 73.7 ± 2.6[b1] |
| 0.25 | 58.3 ± 2.5 | 90.0 | 43.7 ± 2.3[ab] | 75.3 ± 2.7[ab] |
| 0.5 | 58.3 ± 2.5 | 85.0 | 43.8 ± 2.5[ab] | 75.4 ± 3.7[ab] |
| 0.75 | 58.3 ± 2.5 | 75.0 | 44.5 ± 2.3[a] | 76.4 ± 3.3[a] |
| 1.0 | 58.3 ± 2.5 | 70.0 | 43.5 ± 2.5[ab] | 74.8 ± 3.3[ab] |
| 0.5 (212 mg/ml) | 58.3 ± 2.5 | 70.0 | 43.4 ± 2.2[ab] | 74.3 ± 1.8[ab] |

[1]Each value is an average value ± standard deviation of 20 fertilized eggs.
[ab]There is a significant difference between different symbols by LSD method (P < 0.05).

Table 3 shows that the hatchability of the fertilized eggs of the control group is 75.0%, but the hatchability of the fertilized eggs to which 0.25 ml or 0.5 ml of the amino acid solution having a concentration of 106.0 mg/ml was injected is from 85 to 90%. Moreover, with regard to the body weight at hatch/egg weight (%), the body weight at hatch/egg weight of the fertilized eggs of the control group is 73.0±2.6%, while the ratios of the fertilized eggs in the two cases were 75.3±2.7% and 75.4±3.7%, respectively, these values indicating a significant difference from the control. Furthermore, when the injected amount of the amino acid solution was 1.0 ml and when 0.5 ml of the amino acid solution having doubled concentration was injected so that the injected amount of amino acids is the same, the hatchability is the same, i.e., 70.0% which is inferior to the value of the control group, but the body weight at hatch/egg weight (%) is 74.8±3.3% and 74.3±1.8%, while the value of the control group is 73.7±2.6%. Thus, the significant difference can be confirmed.

Example 3

Influence of the injection of amino acid into broiler fertilized eggs at later stage of incubation on hatchability and body weight at hatch:

Fertilized eggs of Cobb broiler were divided into seven groups, each group being composed of 20 eggs.

In order to examine the influence of the injection of amino acids at later stage of incubation on hatchability, seven groups were set, one group being a control and amino acids being injected into the eggs of each one of the remaining six groups at each one day of from day 14 of the incubation to day 19 which is immediately before hatch. Fertilized eggs having an average egg weight of 68 g were used and incubated at a temperature of 37.8° C. and a relative humidity of 60%. Specifically, the following groups were set: a control group; and seven groups in total wherein 0.5 ml of 106 mg/ml of an amino acid solution having the protein composition which is the same as that of the whole egg proteins was injected into each of the fertilized eggs on days 14, 15, 16, 17, 18 and 19 of the incubation. A 1 ml syringe for tuberculinization and a needle of 27G×¾' were used for the injection of amino acids.

Hatchability and body weights at hatch were measured. The results obtained were subjected to a $\chi$-square test to compare the hatchability. The other results were subjected to analysis of variance.

Since fertilized eggs exhibiting very high hatchability were used, the hatchability in the control group was found to be a high rate, i.e., 96.4%, and the injected group on day 14 of the incubation resulted in a similar high hatchability (Table 4). However, the hatchability decreased in the groups wherein the injection was carried out thereafter. The reason why the hatchability decreased is considered that the amino acid solution was injected into the air cell because the needles used for the injection were short. Only one example of no hatch because of the insertion of the needle into embryo was observed among the injected group injected on day 19 of the incubation. From these results, there is a possibility of overcoming the problem of hatchability by investigating the conditions for injecting amino acids and the problem is not significant when the injection of the vaccine for Marek's disease is considered.

Example 4

Influence of the injection of amino acid into fertilized eggs of different kind of broilers at later stage of incubation on hatchability and body weight at hatch:

Two hundred fertilized eggs of Cobb and Arbor Acres broilers were purchased and the eggs were divided into 2 groups per each kind of chickens, each group being composed of 50 eggs, so that each group had the same average egg weight (65.0±4.0 g and 64.9±4.2 g; average egg weight±standard deviation). One group was a control group. With regard to the fertilized eggs, the starting day of the incubation was zero day, and a group to which an amino acid solution was injected was set.

Incubation was carried out at a temperature of 37.8° C. and a relative humidity of 60%. The eggs under incubation were checked every one week to remove undeveloped eggs.

Day 19 of the incubation, all the fertilized eggs were taken out of the incubator, and a hole was made at the eggshell on the air cell of each egg of the group to be injected with amino acids, followed by injection of 0.5 ml of a solution (hereinafter, referred to as an "amino acid solution") of an amino acid mixture dissolved in sterile distilled water into the egg yolk, the mixture being used in an amount so as to become a concentration of 106 mg/ml. Thereafter, the hole was closed with paraffin, the eggs were returned to the incubator with in 1 hour from the taken-out, and the incubation was continued. The injection treatment was carried out aseptically in a clean bench.

After hatching, the hatching time and the body weight at the hatch were measured.

The amino acid solution used for the injection had a composition similar to the composition shown in Table 1 with the exception that sparingly soluble tyrosine was replaced by phenylalanine. A 1 ml disposable syringe (manufactured by Terumo Corporation) was used as the syringe for injecting the amino acid solution into the fertilized eggs and 27G×¾" (manufactured by Terumo Corporation) was used as the needle.

With regard to the hatchability, a significant difference was determined by a $\chi$-square test based on the results obtained. With regard to other indexes, analysis of variance was performed. The statistical risk was set to 5%.

As shown in Table 5, the hatchability of the fertilized eggs of Arbor Acres broiler is 87.8% in the amino acid-injected group, which is almost the same as 87.4% in the control group, so that no difference between them was observed. Moreover, in the case of the fertilized eggs of Cobb broiler, the hatchability is 86.7% in the amino acid-injected group, which is slightly higher than 84.4% in the control group.

The ratio of the body weight at hatch/egg weight is significantly increased by the injection of amino acids irrespective of the difference of kind of chickens.

TABLE 4

| Treated day | Egg numbers | Initial egg weight (g) | Hatched egg weight (g) | Hatchability (%) | Body weight at hatch (g) | Body weight at hatch/egg weight (%) |
|---|---|---|---|---|---|---|
| Control | 29 | 65.6 ± 4.8 | 65.6 ± 5.0 | 96.6 | 49.1 ± 3.5 | 74.9 ± 2.5$^b$ |
| 14 | 33 | 65.7 ± 4.8 | 65.8 ± 5.0 | 96.9 | 50.0 ± 3.5 | 76.1 ± 2.1$^{ab}$ |
| 15 | 31 | 67.9 ± 4.8 | 65.9 ± 4.4 | 93.5 | 50.1 ± 3.3 | 76.2 ± 5.3$^{ab}$ |
| 16 | 31 | 66.6 ± 4.8 | 65.9 ± 4.8 | 93.5 | 50.7 ± 3.2 | 77.1 ± 1.6$^{ab}$ |
| 17 | 28 | 65.7 ± 4.8 | 65.9 ± 5.0 | 89.3 | 49.6 ± 3.3 | 75.4 ± 1.2$^{ab}$ |
| 18 | 32 | 65.7 ± 4.8 | 65.4 ± 4.5 | 87.5 | 49.2 ± 3.7 | 75.2 ± 3.0$^b$ |
| 19 | 32 | 65.7 ± 4.8 | 65.7 ± 5.0 | 90.6 | 49.6 ± 4.6 | 75.5 ± 4.5$^{ab}$ |

$^{ab}$There is a significant difference between different symbols. The values are shown by average ± standard deviation. Hatchability is calculated excluding unfertilized eggs.

TABLE 5

| Line | Group | Egg numbers | Initial egg weight (g) | Hatched egg weight (g) | Hatchability (%) | Body weight of chick at hatch (g) | Body weight at hatch/egg weight (%) |
|---|---|---|---|---|---|---|---|
| Arbor Acres | control | 48 | 64.9 ± 4.8 | 65.0 ± 4.3 | 87.4 | 48.0 ± 3.4 | 74.0 ± 0.6 |
|  | injected | 49 | 64.9 ± 4.8 | 64.8 ± 4.0 | 87.8 | 48.4 ± 3.8 | 74.7 ± 1.4 |
| Cobb | control | 45 | 64.9 ± 4.8 | 64.7 ± 3.0 | 84.4 | 47.0 ± 3.0 | 72.6 ± 0.7 |
|  | injected | 45 | 65.0 ± 4.8 | 65.1 ± 4.3 | 86.7 | 48.1 ± 3.8 | 73.8 ± 1.5 |
| P< | line |  | NS | NS |  | NS | 0.05 |
|  | injected |  | NS | NS |  | NS | 0.05 |
|  | interaction | NS | NS | NS | NS | NS |  |

The values are shown by average ± standard deviation. Hatchability is calculated excluding unfertilized eggs.
NS = no significant difference

INDUSTRIAL APPLICABILITY

According to the present invention, one or all of the purposes of improving hatchability of fertilized eggs and enhancing body weight at hatch/egg weight (%) can be accomplished by appropriately selecting the combination of the concentration and amount of an amino acid solution to be used in the method of injecting amino acids into fertilized eggs at a suitable stage after the start of incubation.

What is claimed is:

1. A method for treating a fertilized egg of a bird, comprising injecting, into a fertilized egg after start of incubation, a solution comprising amino acids which determine the nutritive value of proteins in said fertilized egg,
    wherein said solution comprising amino acids further comprises at least one ingredient selected from the group consisting of an antioxidant, a nutritional supplement other than said amino acids, a vaccine, and mixtures thereof.

2. The method according to claim 1, wherein said fertilized egg is a chicken egg on days 13 to 19 of incubation.

3. The method according to claim 1, wherein said fertilized egg is a chicken egg on days 13 to 14 of incubation.

4. The method according to any one of claims 1 to 3, wherein said solution comprising amino acids is a mixed solution of amino acids having a composition which is almost the same as the amino acid composition in said fertilized egg before the start of incubation.

5. A method for hatching a fertilized egg of a bird, comprising hatching a fertilized egg after start of incubation treated according to the method of any one of claims 1 to 3.

6. A fertilized egg of a bird after start of incubation, said egg being treated according to the method of any one of claims 1 to 3.

7. A bird hatched from a fertilized egg after start of incubation, said egg being treated in accordance with the method according to any one of claims 1 to 3.

8. A method for increasing the body weight of a chick at hatch, comprising injecting, into a fertilized egg after start of incubation, a solution comprising amino acids which determine the nutritive value of proteins in said fertilized egg,
    wherein said solution comprising amino acids further comprises at least one ingredient selected from the group consisting of an antioxidant, a nutritional supplement other than said amino acids, a vaccine, and mixtures thereof.

9. The method according to claim 8, wherein said fertilized egg is a chicken egg on days 13 to 19 of incubation.

10. The method according to claim 8, wherein said fertilized egg is a chicken egg on days 13 to 14 of incubation.

11. The method according to any one of claims 8 to 10, wherein said solution comprising amino acids is a mixed solution of amino acids having a composition which is almost the same as the amino acid composition in said fertilized egg before the start of incubation.

12. A method for increasing the hatchability of a fertilized egg of a bird, comprising injecting, into said fertilized egg after start of incubation, a solution comprising amino acids which determine the nutritive value of proteins in said fertilized egg,
    wherein said solution comprising amino acids further comprises at least one ingredient selected from the group consisting of an antioxidant, a nutritional supplement other than said amino acids, a vaccine, and mixtures thereof.

13. The method according to claim 12, wherein said fertilized egg is a chicken egg on days 13 to 19 of incubation.

14. The method according to claim 12, wherein said fertilized egg is a chicken egg on days 13 to 14 of incubation.

15. The method according to any one of claims 12 to 14, wherein said solution comprising amino acids is a mixed solution of amino acids having a composition which is almost the same as the amino acid composition in said fertilized egg before the start of incubation.

16. A method of preparing a treated fertilized egg, said method comprising injecting, into a fertilized egg after start of incubation, a solution comprising amino acids which determine the nutritive value of proteins in said fertilized egg,
    wherein said solution comprising amino acids further comprises at least one ingredient selected from the group consisting of an antioxidant, a nutritional supplement other than said amino acids, a vaccine, and mixtures thereof.

17. The method according to claim 16, wherein said fertilized egg is a chicken egg on days 13 to 19 of incubation.

18. The method according to claim 16, wherein said fertilized egg is a chicken egg on days 13 to 14 of incubation.

19. The method according to any one of claims 16 to 18, wherein said solution comprising amino acids is a mixed solution of amino acids having a composition which is almost the same as the amino acid composition in said fertilized egg before the start of incubation.

20. A method of preparing a bird chick, said method comprising hatching a treated fertilized egg, wherein said treated fertilized egg is prepared by a method comprising injecting, into a fertilized egg after start of incubation, a solution comprising amino acids which determine the nutritive value of proteins in said fertilized egg, wherein said solution comprising amino acids further comprises at least one ingredient selected from the group consisting of an antioxidant, a nutritional supplement other than said amino acids, a vaccine, and mixtures thereof.

21. The method according to claim 20, wherein said fertilized egg is a chicken egg on days 13 to 19 of incubation.

22. The method according to claim 20, wherein said fertilized egg is a chicken egg on days 13 to 14 of incubation.

23. The method according to any one of claims 20 to 26, wherein said solution comprising amino acids is a mixed solution of amino acids having a composition which is almost the same as the amino acid composition in said fertilized egg before the start of incubation.

* * * * *